Sept. 16, 1958 R. C. ASHENDEN, JR 2,851,942
COFFEE URN
Filed Dec. 28, 1954

INVENTOR.
Richard C. Ashenden, Jr.
BY
Kenway, Jenney, Witter & Hildreth
Attys.

United States Patent Office 2,851,942
Patented Sept. 16, 1958

2,851,942

COFFEE URN

Richard C. Ashenden, Jr., Winchester, Mass.

Application December 28, 1954, Serial No. 478,128

1 Claim. (Cl. 99—290)

This invention comprises a new and improved coffee urn for use in hotels, restaurants, or wherever it is desired to supply large quantities of fresh hot coffee of uniform strength and concentration.

The principal object of the invention is to provide an urn constructed and arranged to ensure these desired results automatically and without requiring in any way the attention or control of an operator or user.

Heretofore urns of this general type have been equipped with hand-operated mixers, and while it is possible under properly supervised conditions to secure satisfactory results, it often happens that the user will forget or slight the proper operation of such a mixer and that the coffee therefore comes through at first too strong and then too weak. The urn of the present invention obviates that objection. As herein shown it includes in its structure a reservoir having vertical side walls, an open top and a bottom outlet, together with a basket for ground coffee removably fitted within the open top of the reservoir and having a depressed drain configuration at its bottom with an outlet opening directed toward the wall of the urn and located adjacent thereto so that beverage essence passing from the basket is caused to flow down the wall of the reservoir and circulate vertically in the liquid contained therein.

I have found that by causing the coffee essence to flow down the vertical wall of the reservoir, it creates a definite and pronounced circulation up and down in the liquid of the reservoir. The circulation thus occurring leads to most rapidly complete and uniform mixing of the entire contents so that coffee of the required strength may be readily drawn off and dispensed. This action is to be contrasted with the tendency to form horizontal striations which occurs when the essence is delivered at a distance from the vertical walls of the urn.

Figure 1:
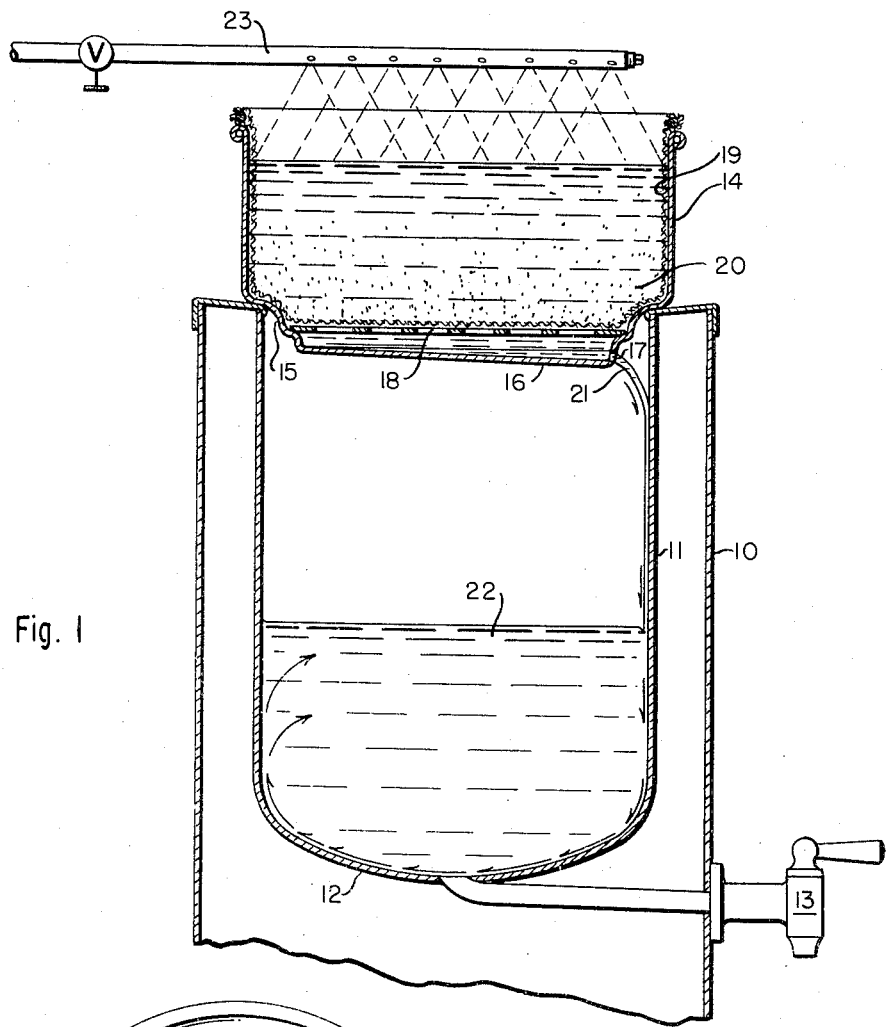
Figure 2:
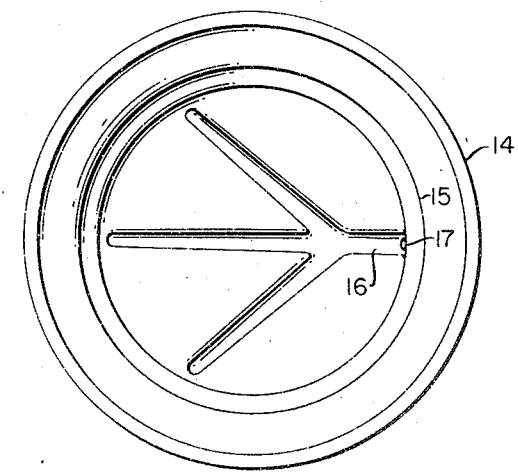

The features and advantages of the present invention will be best understood and appreciated from the following description of a preferred embodiment thereof selected for purposes of illustration and shown in the accompanying drawings in which:

Fig. 1 is a view of the urn in vertical section, and
Fig. 2 is a plan view of the removable basket.

As herein shown the urn comprises a metal outer casing 10 in which is formed a cylindrical reservoir 11 having an open top and a concave and unobstructed bottom 12 from the lowest point of which leads an outlet connection terminating in a cock 13 that projects from the casing 10. The reservoir is generally cylindrical in shape and its vertical walls are spaced from the casing 10 so that it is surrounded by an annular space for hot water for heating the reservoir.

A circular metal basket 14 has an annular shoulder 15 which merges downwardly into a flat bottom having formed therein a depressed drain configuration 16. The drain configuration includes several branches which converge and slope downwardly to an outlet opening 17.

The annular shoulder 15 is of such shape and dimensions as to support the basket with its bottom and lower portion fitting within the upper portion of the reservoir and with the outlet opening 17 spaced slightly within the vertical wall of the reservoir. The drain configuration and the outlet opening 17 are so designed and proportioned that the coffee essence discharged through the opening flows in a stream 21 immediately into contact with the vertical wall of the reservoir, and by reason of this initial direction and surface tension of the liquid, the coffee essence will be found to flow downwardly in contact with the vertical wall of the reservoir and into the liquid contained therein where it tends to follow the inward curvature of the unobstructed bottom and to create a definite vertical circulation. In this way the entire contents of the reservoir is converted to a mixture of uniform concentration.

The basket is provided with a perforated disk 18 which rests upon the shouldered wall of the basket 14 and is thus held a short distance above the bottom of the basket where it acts as a spacer and permits the unobstructed flow of the coffee essence to and along the depressed drain configuration 16. When the urn is to be used the basket 14 is provided with a wire-rimmed cloth bag 19 in which the ground coffee 20 is placed. Above the basket is provided a perforated head 23 for supplying hot water copiously to the ground coffee contents of the bag 19.

It will be understood that the precise shape of the drain configuration is of secondary importance and that in practice it may take any shape that is effective to collect the liquid passing from the basket and cause it to flow into contact with the upright wall of the storage reservoir.

The urn as herein described may be constructed, for example, in two or six gallon size. In operating an urn of three gallon size, the basket will be filled with ground coffee to a depth of 1½ to 2". Boiling water is then sprayed for about 12 minutes from the head 23. During this interval the basket will fill nearly to the top and the liquid coffee will begin to discharge from the outlet opening 17, flow down the wall of the reservoir and accumulate therein. After cutting off the spray from the head 23, about 4 minutes more is required to drain the basket and during all this time the whole contents of the reservoir is subjected to continuous circulation and mixing as above explained.

While the urn has been described as adapted particularly for making coffee, its use is of course not restricted to any specific beverage.

Having thus disclosed my invention and described an illustrative embodiment thereof, I claim as new and desire to secure by Letters Patent:

A beverage urn comprising a reservoir having vertical side walls merging into a concave unobstructed bottom, a water supply head located above the reservoir, and a basket for coffee or the like removably fitted within the side walls at the top of the reservoir and having a bottom wall provided with a depressed drain leading to one side thereof to a single bottom outlet, said outlet being directed toward the side wall of the urn and located adjacent thereto but spaced therefrom, whereby beverage essence passing from the basket is collected in a stream at one side of the reservoir and caused to flow first outwardly in a single stream and then down the vertical wall of the reservoir and to follow the concave curvature of the bottom inwardly and create circulation of the liquid contained in the reservoir.

References Cited in the file of this patent

UNITED STATES PATENTS

| | | |
|---|---|---|
| D. 162,791 | Citero | Apr. 10, 1951 |
| 537,961 | Bechaux | Apr. 23, 1895 |
| 1,015,058 | Moneuse | Jan. 16, 1912 |
| 1,108,288 | Watson | Aug. 25, 1914 |
| 1,317,717 | McKenney | Oct. 7, 1919 |
| 1,646,022 | Hagel | Oct. 18, 1927 |
| 1,882,140 | Haines | Oct. 11, 1932 |
| 1,922,782 | Schallis | Aug. 15, 1933 |
| 2,137,300 | Allen | Nov. 22, 1938 |
| 2,437,601 | Hamlet | Mar. 9, 1948 |
| 2,522,102 | Dold | Sept. 12, 1950 |
| 2,566,127 | Fuhrman | Aug. 28, 1951 |

FOREIGN PATENTS

| | | |
|---|---|---|
| 77,339 | Germany | Sept. 27, 1894 |